United States Patent [19]
Hergenhan

[11] 3,958,169
[45] May 18, 1976

[54] ELIMINATING DC-DC CONVERTER SWITCHING TRANSIENTS IN DIGITAL SYSTEMS

[75] Inventor: Odo Hergenhan, Hightstown, N.J.

[73] Assignee: Burroughs Corporation, Detroit, Mich.

[22] Filed: Sept. 24, 1974

[21] Appl. No.: 508,894

[52] U.S. Cl.................................. 321/2; 321/11
[51] Int. Cl.² .................................. H02M 3/335
[58] Field of Search .................. 321/2, 11–13, 321/16, 45 R, 40; 317/49; 330/207 P; 331/47, 50, 51, 55, 113 A; 328/165; 58/23 R, 23 BA; 307/87

[56] References Cited
UNITED STATES PATENTS

| | | | |
|---|---|---|---|
| 3,461,405 | 8/1969 | Bishop et al. | 331/113 A |
| 3,551,777 | 12/1970 | Bingley | 331/47 |
| 3,629,725 | 12/1971 | Chun | 331/113 A |
| 3,750,383 | 8/1973 | Kakizawa | 58/23 BA |
| 3,794,907 | 2/1974 | Fucito | 321/16 |
| 3,818,484 | 6/1974 | Nakamura et al. | 321/15 |
| 3,842,589 | 10/1974 | Luce et al. | 58/23 BA |

*Primary Examiner*—William M. Shoop
*Attorney, Agent, or Firm*—Robert J. Gaybrick; Franklin D. Ubell; William B. Penn

[57] ABSTRACT

A power supply system for use in conjunction with digital systems and particularly adapted to avoid impairment of digital system performance by power supply generated noise. The clock frequency of the digital system is monitored, divided and then applied to control the switching frequency of a D.C. to D.C. power converter. The converter thus switches at a synchronized submultiple of the digital clock frequency such that switching transients are confined to transition times within the digital system.

17 Claims, 3 Drawing Figures

ELIMINATING DC-DC CONVERTER SWITCHING TRANSIENTS IN DIGITAL SYSTEMS

BACKGROUND OF THE INVENTION

This invention relates broadly to the improvement of the integrity of digital systems and more specifically to an improved power supply system, which eliminates adverse effects of power supply generated noise upon digital systems.

In the prior art, it is well-known to use unbalanced magnetic core D.C. to D.C. conversion in power supply systems. When D.C. to D.C. conversion is used in conjunction with digital systems, deleterious effects can arise from the unwanted noise produced as a result of the A.C. excitation of transformer coils associated with D.C. to D.C. converters. If the digital system is not protected in some manner from the noise produced by switching transients in the power supply, such transient noise will appear on the logic lines within the digital system and result in erroneous detection of data bits. While many advances have been made in the improvement of D.C. to D.C. converter power supplies themselves, prior art approaches to protecting digital systems from switching transients have remained confined to the use of extensive R.F. shielding and bulky feedthrough filters. Such brute force shielding of the converter and filtering of the power lines results in increased expense, weight and cost of the digital system.

SUMMARY OF THE INVENTION

It is therefore an object of the invention to eliminate the adverse effects of power supply generated noise upon digital systems.

It is another object of the invention to provide a more effective, less expensive and more efficient method for eliminating the adverse effects of power supply switching transients on the integrity of digital systems.

It is an additional object of the invention to improve power supplies used in conjunction with digital systems.

It is a particular object of the invention to provide a power supply system employing the advantages of D.C. to D.C. conversion while avoiding the disadvantages occasioned by noise generation associated with such conversion.

These and other objects of the invention are accomplished by controlling the switching frequency within a D.C. to D.C. converter to be an exact submultiple of the clock or bit rate of the associated digital system, thus causing the D.C. to D.C. converter to switch only during bit transitions within the digital system. This control is accomplished by tapping the system clock or bit rate signal and feeding the tapped signal to a divider, which produces an output signal whose frequency is a submultiple of the clock or bit rate. This submultiple signal is then utilized to control the switching frequency of the D.C. to D.C. converter.

BRIEF DESCRIPTION OF THE DRAWING

Other objects, advantages and features of this invention will become more apparent after consideration of the accompanying detailed description, appended claims and drawings of which:

DETAILED DESCRIPTION OF THE PREFERRED EMBODIMENT

Figure 2:
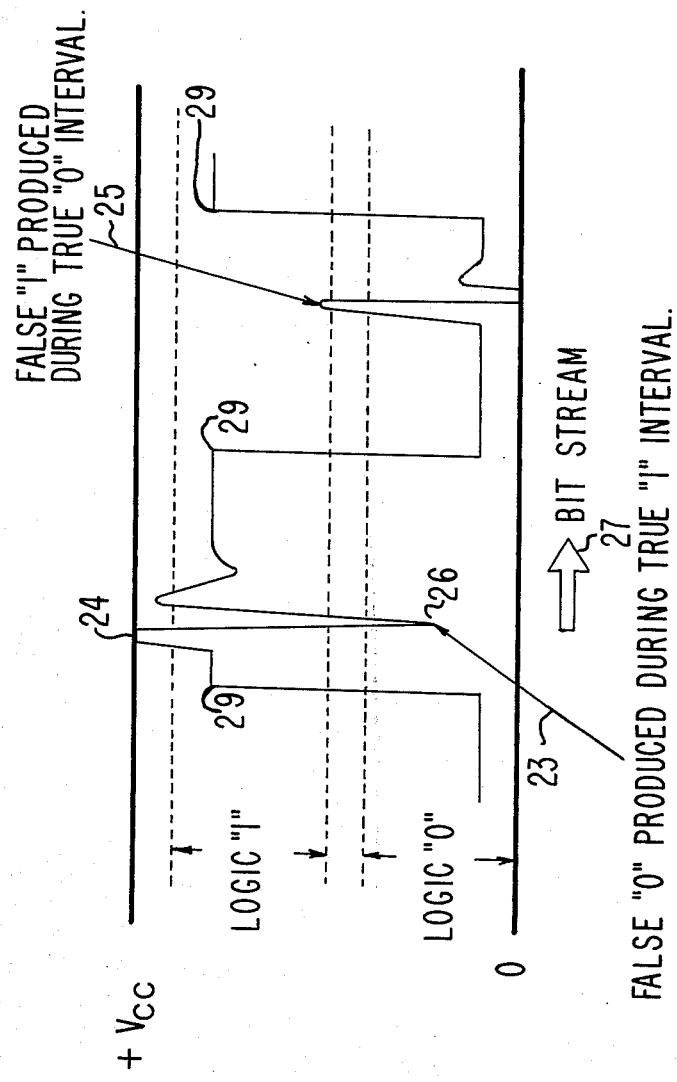
FIG. 2 is a signal diagram illustrating the effect of power converter switching transients on logic lines.

The technique of the invention is best understood by reference to FIG. 2, which shows the effect of unwanted transients upon digital data patterns. As a result of the fast switching time necessary for high efficiency in D.C. to D.C. converters, such converters generate electromagnetic radiation, which manifests itself on logic lines as current or voltage transients 23, 25. At the logic "1" or true level, the positive portion of the transient 24 is clamped at, or near a voltage level $V_{cc}$. However, the negative portion of the transient 26 can swing freely towards the logic "0" or false level. If the negative portion of the transient 26 remains at the "0" level for a time within the response time of the system, a logic "0" will be indicated where only a logic "1" level should have been present. Thus, errors can be introduced into the system, resulting in improper system procedure or incorrect data readout.

According to the invention such problems may be eliminated by confining the occurrence of power converter transients to bit transitions 29 within the bit stream 27. In the preferred embodiment of the invention, this confinement is accomplished by synchronizing the switching frequency within the D.C. to D.C. converter to be a submultiple of the digital system clock rate.

Figure 1:
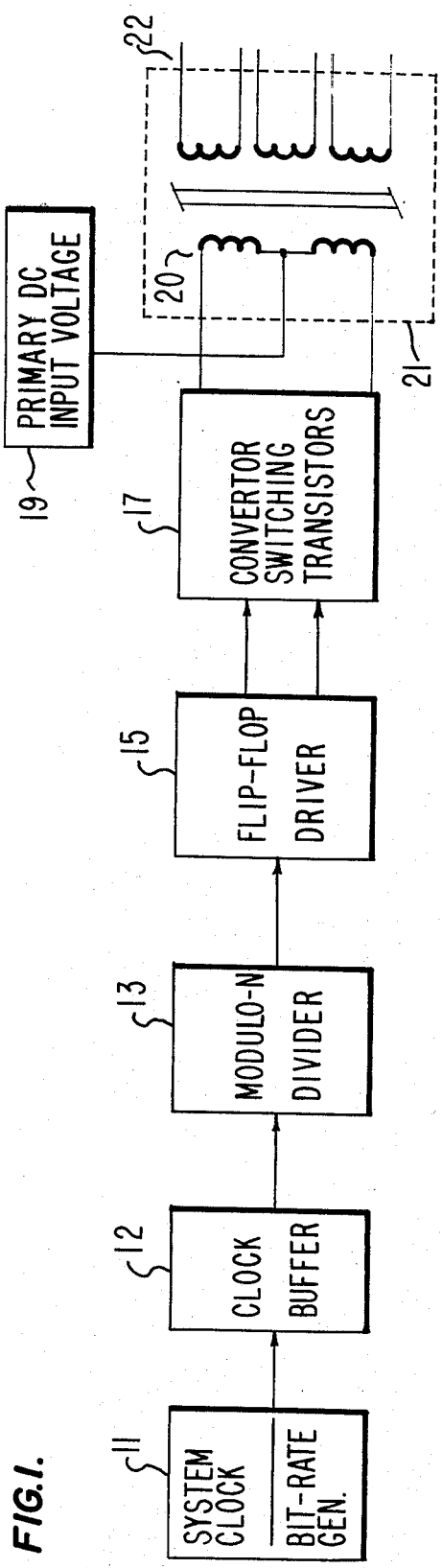
FIG. 1 is a schematic block diagram of the power supply system of the preferred embodiment of the invention.

In the preferred embodiment of the invention, this synchronization is accomplished by the power supply system shown generally in FIG. 1. The system includes a clock buffer 12, which transfers a sample of the system clock or bit rate from the system clock or bit rate generator 11 to a modulo-N divider 13. The modulo-N divider produces a submultiple of the system clock or bit rate signal, which is used to trigger a flip-flop driver 15. The flip-flop driver 15 in turn controls the switching of the converter switching transistors 17, which serve to modulate the D.C. input voltage supplied by supply source 19. This modulation causes transfer of power from the primary windings 20 of the converter transformer 21. Since the frequency of the flip-flop driver is a submultiple of the system clock rate, the switching frequency within the D.C. to D.C. converter coils 20, 22 is likewise a submultiple of the system clock or bit rate.

The clock buffer 12 minimizes loading of the clock generator 11 and prevents feedback from the modulo-N divider 13 into the clock generator 11. This buffer stage 12 can be simply constructed by connecting an operational amplifier as a unity gain voltage follower, thus presenting a high voltage impedance to the clock generator 11 and a low driving source impedance to the modulo-N divider 13. Thus, in the preferred embodiment, the intermediate signal developed by the buffer 12 and supplied to the divider 13 has the same frequency as the signal produced by the system clock or bit rate generator 11.

The modulo-N divider 13 of the preferred embodiment is a programmable frequency divider whose divisor N is the ratio of the clock rate developed to twice the synchronized operating frequency of the converter or:

$$N = \frac{f \text{ clock}}{2f \text{ converter}}$$

For example, if the clock frequency equals 1 mHz and the desired switching frequency of the D.C. to D.C. converter is 20 kHz, then N equals 25. This magnitude of division can be easily achieved with two quinary dividers. Any other whole integer can be obtained by utilizing a maximal sequence generator having a maximum number of stable states of $2^{N-1}$ where N is the total number of flip-flops used in the generator.

Figure 3:
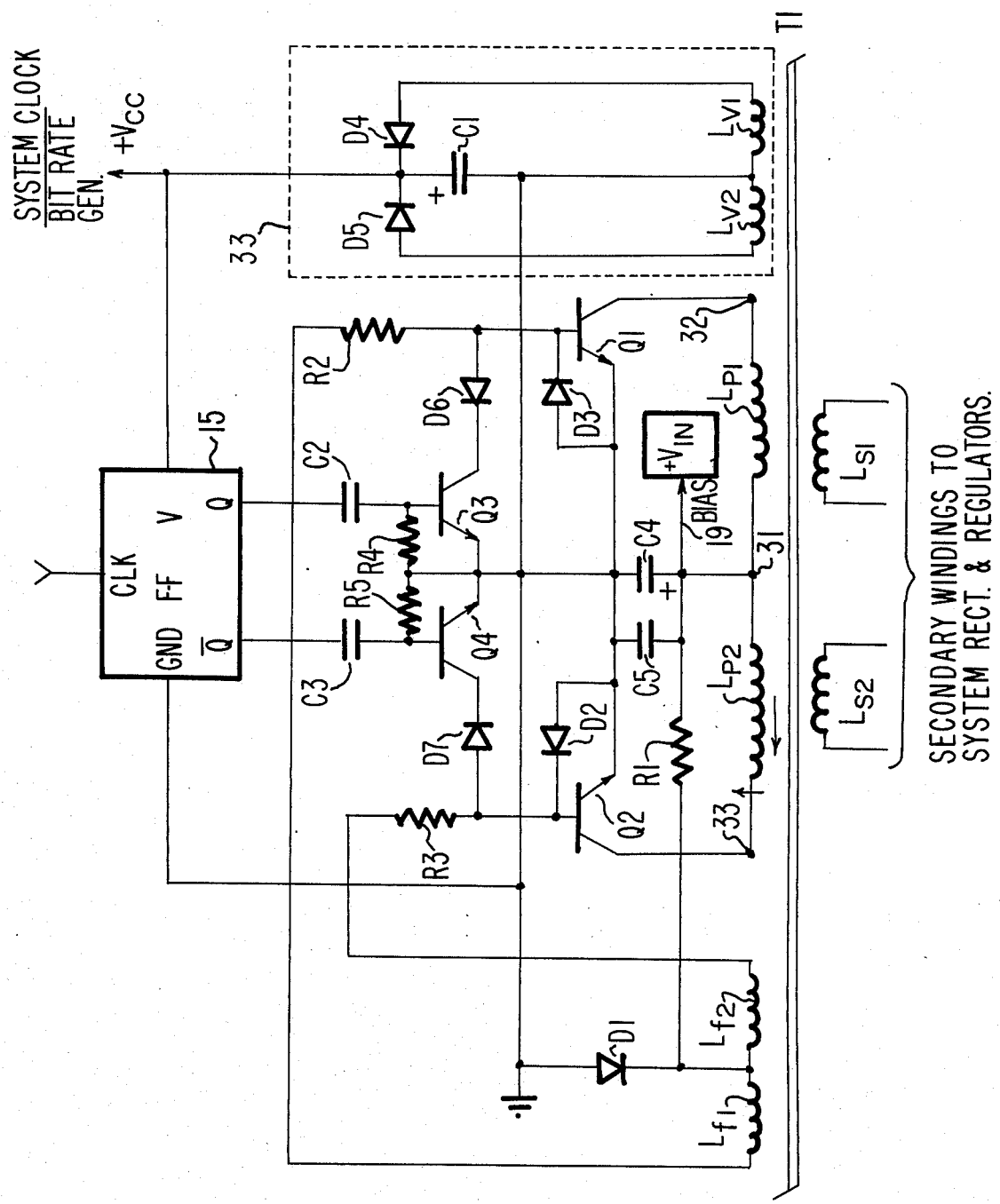
FIG. 3 is a schematic diagram particularly showing the driver-converter circuitry of the preferred embodiment of the invention.

The flip-flop driver 15 serves to convert the single-phase signal from the modulo-N divider to the split phase signal necessary for alternately energizing the switching transistors Q3, Q4 shown in FIG. 3. Operation of the flip-flop 15 is in its simplest mode—toggling the clock input. Operated in this manner, the Q and Q̄ flip-flop outputs provide a square wave to the D.C. to D.C. converter at ½ the output rate of the divider.

As shown in FIG. 3, the D.C. to D.C. converter circuit of the preferred embodiment is based upon two primary windings $L_{p1}$ and $L_{p2}$ on transformer T1 and two switching transistors Q1, Q2. The windings $L_{p1}$, $L_{p2}$ are connected in common to a source of D.C. voltage 19 at a common point 31. The opposite terminal 32 of the first primary winding $L_{p1}$ is connected to the collector of a first switching transistors Q1, and the other terminal 33 of the second primary winding $L_{p2}$ is connected to the collector of a second switching transistor Q2. The base of the first switching transistor Q1 is connected by a resistor R2 to the first terminal of a first feedback coil $L_{f1}$, while the base of the second switching transistor Q2 is connected via the resistor R3 to the first terminal of a second feedback coil $L_{f2}$. The respective second terminals of the feedback coils $L_{f1}$ and $L_{f2}$ are connected in common via a resistor R1 to the voltage source 19 and to ground via a diode D1. Together the resistor R1 and the diode D1 comprise a starting circuit for the D.C. to D.C. converter.

Additional elements are added to the circuit to perform frequency bypass and protection functions. In particular, clamp diodes D2, D3 are connected respectively across the base emitter junctions of switching transisters Q1 and Q2 in order to limit the reverse base-emitter voltage across Q1 and Q2. Additionally, an electrolytic capacitor C4 and a ceramic capacitor C5 are connected from the voltage source 19 to ground. These capacitors form a broad-band, low impedance capacitor which effectively bypasses the fundamental converter switching frequency and all higher harmonics.

From a broad perspective, the converter circuitry of FIG. 3 operates as follows. A. D.C. supply voltage 19 is applied to an A.C. intermediate stage including elements Q1, Q2, $L_{p1}$, $L_{p2}$, $L_{f1}$, $L_{f2}$, R2, R3 which cooperate to produce an A.C. oscillation. The level of this oscillation is controlled by the D.C. power supplied by the source 19. The intermediate stage includes a transformer T1, which when excited on its primary side by the A.C. oscillation produces a second alternating voltage on its secondary side. This second voltage can be supplied to a D.C. stage including rectification circuitry for producing a D.C. output at the transformed voltage level.

More particularly, operation of the converter in its free-running mode occurs when a D.C. voltage is applied at the terminal 19 and thus to the bases of the switching transistors Q1, Q2 through the starting resistor R1. Turn-on of the second switching transistor Q2 is favored by making the second current limiting resistor R3 lower in value as compared to the first current limiting resistor R2.

After the second switching transistor Q2 is turned on, its base current increases, aided by a feedback current produced by the second feedback winding $L_{f2}$. Concurrently, the collector current through the primary coil $L_{p2}$ increases. When the second switching transistor Q2 is driven into saturation by the increasing base current, the collector current ceases to increase, resulting in a collapsing field in the second primary coil $L_{p2}$ and a resultant flux reversal, which serves to turn on the first switching transistor Q1. This transistor Q1 likewise proceeds to saturate under the increasing base drive from the first feedback coil $L_{f1}$. The resultant stabilization of collector current turns off the first switching transistor Q1 and again turns on the second switching transistor Q2. This alternate energization of the switching transistors Q1, Q2 sets up an oscillating electrical signal in the windings of the transformer T1, resulting in the transfer of voltage from the primary windings $L_{p1}$ and $L_{p2}$ to the secondary winding $L_{s1}$, $L_{s2}$ of the transformer T1. The voltage thus created at the secondary windings $L_{s1}$ and $L_{s2}$ may be subjected to rectification and regulation as known in the prior art to provide a D.C. power source for an associated digital system.

In the preferred embodiment, the excitation of the transformer T1 also serves to develop a voltage across first and second auxiliary windings $L_{v1}$ and $L_{v2}$. These windings are provided to develop a bias voltage for the flip-flop driver 15, the modulo-N divider 13, and the system clock or bit rate generator 11. Both the auxiliary windings $L_{v1}$, $L_{v2}$ are identical (bifilar wound) with sufficient turns to provide the required bias voltage in conjunction with full wave rectifier diodes D4 and D5 and a filter capacitor C1. Since the voltage developed across the auxiliary windings $L_{v1}$, $L_{v2}$ is essentially a square wave, the filter capacitor C1 can be small and the bias voltage obtained will be the voltage developed across the auxiliary winding less one diode drop.

In order to accomplish synchronization with the digital system clock rate, the free running D.C. to D.C. converter as thus far described is subjected to the output Q, Q̄ of the flip-flop 15 by means of first and second driver transistors Q3, Q4. The base of the transistor Q3 is connected to the Q output of the flip-flop 15 via a capacitor C2 and a resistor R4, and the base of transistor Q4 is connected to the Q̄ output of the flip-flop 15 by a capacitor C3 and a resistor R5. This RC coupling to the bases of the driver transistors Q3, Q4 eliminates any D.C. component associated with the Q and Q̄ outputs. The respective emitters of the driver transistors Q3 and Q4 are grounded, while their collectors are connected via Shottky diodes D6, D7 to the respective bases of the switching transistors Q1 and Q2.

The driver transistors Q3, Q4 are chosen to have low $V_{ce}(sat)$ such that in conjunction with the Shottky diodes D6, D7 the positive voltage at the base of Q1 and Q2 during their respective unsynchronized "ON" times will be less than .7 volts. Thus, assuming the flip-flop output Q is high, the driver transistor Q3 is saturated and the switching transistor Q1 will remain off until the flip-flop 13 changes state. Similarly the Q2 "ON" time will be determined by the Q4 "ON" time.

In operation, upon completion of one full cycle of free-running, unsynchronized oscillation within the transformer T1, the bias voltage supplied by the logic supply 33 reaches its nominal output, enabling the driver flip-flop 15, the modulo-N divider 13 and the system clock 11. After a sufficient number of clock pulses have been passed through the divider 13 to change the state of the flip-flop 15, operation of the converter driver transistors Q3, Q4 occurs. As the flip-flop outputs Q and Q are alternately driven high, the respective driver transistors Q3 and Q4 are alternately driven into saturation. The switching of the switching transistor Q1, Q2 is then controlled by the driver transistors Q2, Q4, and synchronization of the converter has been achieved. The number of clock pulses necessary to obtain initial synchronization is determined by the N of the modulo divider 13 and the flip-flop 15. Once synchronized, the converter switching transitions will occur precisely at the clock or bit rate transitions within the digital system.

A major design consideration in the preferred embodiment of the invention is the free-running frequency of the D.C. to D.C. converter, which is determined primarily by the output transformer T1. In the preferred embodiment, the free-running frequency of the converter must be lower than the frequency at which the converter is to be synchronized. This must be true under all worst case conditions of the input line, secondary load and operating temperature range. A toroidal core having a square loop characteristic is preferred for the transformer T1. The design of transformers to meet the requirements of the preferred embodiment of the invention is well-known in the art.

While a particularly advantageous embodiment of the subject invention has been set forth, it is apparent that numerous modifications might be made in the method and apparatus as disclosed without departing from the scope and spirit of the invention. It is therefore to be understood that, within the scope of the appended claims, the invention may be practiced other than as specfically described.

What is claimed is:

1. In conjunction with a digital system wherein data representation depends at least in part on a fixed frequency signal, a power supply system comprising:
    means for converting a D.C. supply voltage to a second D.C. voltage level, said means employing an intermediate A.C. stage producing switching transients of a type normally deleterious to said data representation; and
    means for controlling switching within said A.C. stage to occur only in synchronization with switching of said fixed frequency signal to confine said transients to transition times in said fixed frequency signal.

2. The power supply of claim 1 wherein said controlling means comprises:
    means for producing a a buffered replica of said fixed frequency signal;
    means for dividing said buffered replica to produce a divided frequency signal wherein transitions occur only in synchronization with transitions in said fixed frequency signal; and
    means receiving an input of said divided frequency signal for controlling said switching within said A.C. stage to occur only in synchronization with said transitions in said divided frequency signal.

3. A method of preventing noise generated by the A.C. excitation in a D.C.-A.C.-D.C. power converter from impairing the integrity of associated digital systems which utilize an internal periodic clock pulse signal comprising the steps of:
    generating a periodic driving pulse signal for said converter said driving pulse signal having a pulse period which is a multiple of the period of said clock pulses; and
    controlling said A.C. excitation of said power converter in synchronization with said driving signal.

4. A power supply system for operation at a controlled frequency in synchronization with a second frequency in a digital system comprising:
    buffer means for providing a buffered signal at said second frequency;
    a frequency divider for dividing the frequency of said buffered signal to produce a divided signal;
    a flip-flop receiving the divided signal and having first and second alternately excited outputs;
    a first driver transistor having its base excited by said first output;
    a second driver transistor having its base excited by said second output; and
    a D.C. to D.C. converter having a transformer and first and second switching transistors, the base of said first switching transistor being driven by the collector of said first driver transistor and the base of said second switching transistor being driven by the collector of said second driver transistor, the collector of each of said first and second switching transistors being connected to the respective first terminal of the first and second primary coils of said transformer, the respective second terminal of each of said coils being connected at a common point to a D.C. supply voltage, said bases of said first and second switching transistors being respectively connected through first and second resistors to the respective first terminals of first and second feedback coils of said transformer, the respective second terminals of said first and second feedback coils each being grounded through a diode.

5. The power supply system of claim 4 wherein the respective bases of said first and second driver transistors are grounded through respective first and second resistors, wherein said bases are further respectively connected to said first and second flip-flop outputs through respective first and second capacitors and wherein the collectors of said driver transistors are respectively connected to said first and second switching transistor bases through respective first and second Shottky diodes.

6. The power supply system of claim 5 further including a broad band, low impedance capacitance connected between said connection point and ground.

7. A power supply for a digital system including a system clock producing periodic system clock pulses of a first fixed duration comprising:
    D.C. to D.C. conversion means employing an intermediate A.C. stage including first and second switching means producing deleterious switching transients;
    buffer means receiving an input from said system clock for outputting a buffered analog signal of said system clock pulse signal;
    frequency divider means for dividing said buffered analog signal to produce a divided signal, said divided signal comprising periodic pulses having a duration which is multiple of that of said first fixed duration; and
driver means receiving an input of said divided signal for alternately exciting said first switching means and said second switching means in synchronization with the said divided signal pulses.

8. The power supply of claim 7 wherein said divider means comprises a Modulo-N divider.

9. The power supply of claim 8 wherein the divisor N of said divider equals the ratio of the frequency of said clock signal to twice the synchronized operating frequency of said converter.

10. The power supply of claim 7 wherein said first and second switching means comprise first and second switching transistors, respectively, and said driving means comprises:
a flip-flop receiving an input of said divided signal and having first and second outputs alternately excited by said divided signal;
a first driver transistor having its base connected to said first flip-flop output and its collector connected for driving said first switching transistor; and
a second driver transistor having its base connected to said second flip-flop output and its collector connected for driving said second switching transistor.

11. The power supply of claim 10 wherein said D.C. to D.C. conversion means further includes transformer means for forming an oscillator with said first and second switching transistors, said oscillator having a free-running frequency lower than said divided signal frequency.

12. The power supply of claim 11 wherein said divider means comprises a Modulo-N divider.

13. The power supply of claim 12 wherein the divisor N of said divider equals the ratio of the frequency of said clock signal to twice the synchronized operating frequency of said converter.

14. In conjunction with a digital system wherein data representation depends at least in part on a first periodic pulse signal, a power supply system comprising:
a power converter employing an intermediate A.C. stage;
means for producing a second periodic pulse signal, the pulses of said second periodic pulse signal having a duration which is a multiple of the duration of the pulses of said first periodic pulse signal; and
means for controlling switching in said intermediate A.C. stage to be in synchronization with transitions in said second periodic pulse signal.

15. In conjunction with a digital system wherein data representation depends at least in part on a fixed frequency signal, a power supply system comprising:
means for converting a D.C. supply voltage to a second D.C. voltage level, said means employing an intermediate A.C. stage producing switching transients of a type normally deleterious to said data representation; and
means for confining the occurrence of said transients to transition times in said fixed frequency signal.

16. The method of protecting a digital system from power supply switching transients wherein data representation in said system depends in part on a system clock producing constant frequency clock signals, said method comprising the steps of:
dividing said system clock signal to produce a switching signal having a frequency which is a submultiple of said clock signal frequency; and
applying said switching signal to said power supply to switch said power supply at a synchronized submultiple of said system clock frequency to thereby confine the occurrence of said power supply switching transients.

17. In a digital system employing a fixed frequency system clock and a D.C. - A.C. - DC. power converter in which transients occur, a method for preventing converter switching transients from affecting digital data patterns within said system, said method comprising the steps of:
providing a switching signal of a predetermined frequency which is a submultiple of said system clock frequency; and
applying said switching signal to said power converter to switch said power converter at a synchronized submultiple of said system clock frequency.

* * * * *